US010906816B2

(12) United States Patent
Kawakami et al.

(10) Patent No.: US 10,906,816 B2
(45) Date of Patent: Feb. 2, 2021

(54) ALUMINA AND METHOD FOR PRODUCING AUTOMOTIVE CATALYST USING SAME

(71) Applicant: SUMITOMO CHEMICAL COMPANY, LIMITED, Tokyo (JP)

(72) Inventors: Yoshitaka Kawakami, Niihama (JP); Kohei Sogabe, Niihama (JP); Tetsu Umeda, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/320,799

(22) PCT Filed: Jul. 21, 2017

(86) PCT No.: PCT/JP2017/026499
§ 371 (c)(1),
(2) Date: Jan. 25, 2019

(87) PCT Pub. No.: WO2018/021192
PCT Pub. Date: Feb. 1, 2018

(65) Prior Publication Data
US 2019/0152795 A1    May 23, 2019

(30) Foreign Application Priority Data

Jul. 29, 2016  (JP) ................................. 2016-149995

(51) Int. Cl.
*C01F 7/30* (2006.01)
*C01F 7/02* (2006.01)
(Continued)

(52) U.S. Cl.
CPC ................. *C01F 7/30* (2013.01); *B01J 21/04* (2013.01); *C01F 7/02* (2013.01); *C01F 7/36* (2013.01);
(Continued)

(58) Field of Classification Search
CPC ....... C01F 7/30; C01F 7/02; C01F 7/36; B01J 21/04
See application file for complete search history.

(56) References Cited

U.S. PATENT DOCUMENTS

| 4,021,185 A | 5/1977 | Hindin et al. |
| 4,220,559 A | 9/1980 | Polinski |

(Continued)

FOREIGN PATENT DOCUMENTS

| EP | 0540228 A1 | 5/1993 |
| EP | 0856350 A1 | 8/1998 |

(Continued)

OTHER PUBLICATIONS

International Preliminary Report on Patentability dated Feb. 7, 2019 in application No. PCT/JP2017/026499.
(Continued)

*Primary Examiner* — James A Fiorito
(74) *Attorney, Agent, or Firm* — Sughrue Mion, PLLC

(57) ABSTRACT

An alumina having a multimodal particle size distribution wherein at least one of the particle sizes giving local maximum values in the particle size distribution is less than 10 μm, and wherein the alumina comprises 1 to 5 wt % of at least one of La and Ba.

6 Claims, 3 Drawing Sheets

(51) Int. Cl.
  *C01F 7/36* (2006.01)
  *B01J 21/04* (2006.01)
  *B01J 37/02* (2006.01)

(52) U.S. Cl.
  CPC ....... *B01J 37/0215* (2013.01); *C01P 2004/51* (2013.01); *C01P 2004/61* (2013.01); *C01P 2006/11* (2013.01); *C01P 2006/12* (2013.01); *C01P 2006/14* (2013.01)

(56) References Cited

U.S. PATENT DOCUMENTS

| | | | |
|---|---|---|---|
| 4,722,920 | A | 2/1988 | Kimura et al. |
| 4,738,946 | A | 4/1988 | Yamashita et al. |
| 4,771,028 | A | 9/1988 | Arai et al. |
| 4,797,139 | A | 1/1989 | Bauer |
| 4,808,564 | A | 2/1989 | Matsumoto et al. |
| 4,868,150 | A | 9/1989 | Spooner et al. |
| 4,902,664 | A | 2/1990 | Wan |
| 5,110,780 | A | 5/1992 | Peters |
| 5,155,085 | A | 10/1992 | Hamano et al. |
| 5,496,788 | A | 3/1996 | Domesle et al. |
| 5,573,582 | A | 11/1996 | Inui et al. |
| 5,575,983 | A | 11/1996 | Suzuki et al. |
| 5,618,772 | A | 4/1997 | Suda et al. |
| 5,804,152 | A | 9/1998 | Miyoshi et al. |
| 5,958,829 | A * | 9/1999 | Domesle ............. B01D 53/945 423/213.5 |
| 2003/0185736 | A1 | 10/2003 | Hatanaka et al. |
| 2005/0019249 | A1 | 1/2005 | Noweck et al. |
| 2006/0172886 | A1 | 8/2006 | Shimazu et al. |
| 2007/0104950 | A1 | 5/2007 | Morikawa et al. |
| 2009/0099013 | A1 | 4/2009 | Morikawa et al. |
| 2009/0188701 | A1 | 7/2009 | Tsuzuki et al. |
| 2009/0232726 | A1 | 9/2009 | Yotou et al. |
| 2009/0275467 | A1 | 11/2009 | Shiratori et al. |
| 2010/0004117 | A1 | 1/2010 | Miura et al. |
| 2010/0021374 | A1 | 1/2010 | Mizuno et al. |
| 2010/0159226 | A1 | 6/2010 | Suchanek et al. |
| 2010/0190640 | A1 | 7/2010 | Nobukawa et al. |
| 2010/0267552 | A1 | 10/2010 | Koranne et al. |
| 2011/0039691 | A1 | 2/2011 | Tomoda et al. |
| 2012/0046163 | A1 | 2/2012 | Ifrah et al. |
| 2013/0203588 | A1 | 8/2013 | Nobukawa |

FOREIGN PATENT DOCUMENTS

| | | |
|---|---|---|
| JP | 48-14600 A | 2/1973 |
| JP | 54-117387 A | 9/1979 |
| JP | 56-121637 A | 9/1981 |
| JP | 57-35939 A | 2/1982 |
| JP | 57-119834 A | 7/1982 |
| JP | 58-122044 A | 7/1983 |
| JP | 60-12132 A | 1/1985 |
| JP | 60-22929 A | 2/1985 |
| JP | 60-222148 A | 11/1985 |
| JP | 60-226414 A | 11/1985 |
| JP | 60-238146 A | 11/1985 |
| JP | 61-35851 A | 2/1986 |
| JP | 61-38627 A | 2/1986 |
| JP | 61-204037 A | 9/1986 |
| JP | 61-254250 A | 11/1986 |
| JP | 61-254251 A | 11/1986 |
| JP | 62-153158 A | 7/1987 |
| JP | 62-176542 A | 8/1987 |
| JP | 62-180751 A | 8/1987 |
| JP | 62-191043 A | 8/1987 |
| JP | 62-254843 A | 11/1987 |
| JP | 63-20035 A | 1/1988 |
| JP | 63-119851 A | 5/1988 |
| JP | 63-134058 A | 6/1988 |
| JP | 63-137753 A | 6/1988 |
| JP | 63-162043 A | 7/1988 |
| JP | 63-175640 A | 7/1988 |
| JP | 63-175642 A | 7/1988 |
| JP | 63-242917 A | 10/1988 |
| JP | 64-58349 A | 3/1989 |
| JP | 64-69511 A | 3/1989 |
| JP | 1-281145 A | 11/1989 |
| JP | 2-59045 A | 2/1990 |
| JP | 2-78438 A | 3/1990 |
| JP | 2-83033 A | 3/1990 |
| JP | 2-99141 A | 4/1990 |
| JP | 2-102735 A | 4/1990 |
| JP | 2-107331 A | 4/1990 |
| JP | 2-122829 A | 5/1990 |
| JP | 2-218436 A | 8/1990 |
| JP | 4-27432 A | 1/1992 |
| JP | 4-270114 A | 9/1992 |
| JP | 4-354536 A | 12/1992 |
| JP | 5-4050 A | 1/1993 |
| JP | 5-31363 A | 2/1993 |
| JP | 5-168925 A | 7/1993 |
| JP | 5-262517 A | 10/1993 |
| JP | 6-7675 A | 1/1994 |
| JP | 6-7683 A | 1/1994 |
| JP | 6-23270 A | 2/1994 |
| JP | 6-134305 A | 5/1994 |
| JP | 6-142516 A | 5/1994 |
| JP | 6-182201 A | 7/1994 |
| JP | 6-190276 A | 7/1994 |
| JP | 6-218282 A | 8/1994 |
| JP | 7-51569 A | 2/1995 |
| JP | 7-88371 A | 4/1995 |
| JP | 7-194975 A | 8/1995 |
| JP | 7-265698 A | 10/1995 |
| JP | 7-284672 A | 10/1995 |
| JP | 7-289896 A | 11/1995 |
| JP | 8-12323 A | 1/1996 |
| JP | 8-12325 A | 1/1996 |
| JP | 8-117602 A | 5/1996 |
| JP | 8-266900 A | 10/1996 |
| JP | 8-290916 A | 11/1996 |
| JP | 9-25119 A | 1/1997 |
| JP | 9-110419 A | 4/1997 |
| JP | 9-507825 A | 8/1997 |
| JP | 9-248448 A | 9/1997 |
| JP | 9-253498 A | 9/1997 |
| JP | 10-45412 A | 2/1998 |
| JP | 10-194733 A | 7/1998 |
| JP | 10-258235 A | 9/1998 |
| JP | 10-277390 A | 10/1998 |
| JP | 2001-170487 A | 6/2001 |
| JP | 2001-170500 A | 6/2001 |
| JP | 2002-11347 A | 1/2002 |
| JP | 2002-522343 A | 7/2002 |
| JP | 2002-293514 A | 10/2002 |
| JP | 2005-504701 A | 2/2005 |
| JP | 2005-306718 A | 11/2005 |
| JP | 2006-21144 A | 1/2006 |
| JP | 2006-35019 A | 2/2006 |
| JP | 2006-36556 A | 2/2006 |
| JP | 2006-55836 A | 3/2006 |
| JP | 2006-136755 A | 6/2006 |
| JP | 2006-224086 A | 8/2006 |
| JP | 2006-231321 A | 9/2006 |
| JP | 2007-268460 A | 10/2007 |
| JP | 2008-137838 A | 6/2008 |
| JP | 2008-150238 A | 7/2008 |
| JP | 2008-526661 A | 7/2008 |
| JP | 2009-61383 A | 3/2009 |
| JP | 2010-505725 A | 2/2010 |
| JP | 2010-180096 A | 8/2010 |
| JP | 2010-194542 A | 9/2010 |
| JP | 2010-207807 A | 9/2010 |
| JP | 2010-269260 A | 12/2010 |
| JP | 2012-86199 A | 5/2012 |
| JP | 2012-519071 A | 8/2012 |
| JP | 2014-500217 A | 1/2014 |
| JP | 2015-188881 A | 11/2015 |
| WO | 96/09247 A1 | 3/1996 |
| WO | 00/09445 A2 | 2/2000 |
| WO | 03/029145 A1 | 4/2003 |
| WO | 2006/070203 A1 | 7/2006 |

(56) References Cited

FOREIGN PATENT DOCUMENTS

| WO | 2007/119658 A1 | 10/2007 |
| WO | 2007/145146 A1 | 12/2007 |
| WO | 2009/001902 A1 | 12/2008 |
| WO | 2009/104386 A1 | 8/2009 |
| WO | 2009/113165 A1 | 9/2009 |
| WO | 2010/100067 A1 | 9/2010 |
| WO | 2011119638 A2 | 9/2011 |
| WO | 2012/067655 A1 | 5/2012 |

OTHER PUBLICATIONS

Communication dated Feb. 6, 2020 from the European Patent Office in application No. 17834199.6.

Communication dated Sep. 15, 2020, from the State Intellectual Property Office of the P.R.C. in application No. 201780046437.0.

* cited by examiner

ALUMINA AND METHOD FOR PRODUCING AUTOMOTIVE CATALYST USING SAME

CROSS REFERENCE TO RELATED APPLICATIONS

This application is a National Stage of International Application No. PCT/JP2017/026499 filed Jul. 21, 2017, claiming priority based on Japanese Patent Application No. 2016-149995 filed Jul. 29, 2016.

TECHNICAL FIELD

The present disclosure relates to alumina and a method for producing an automotive catalyst prepared by using the same.

BACKGROUND ART

Alumina, which is excellent in heat resistance, insulation, abrasion resistance, corrosion resistance, etc., is widely used in various applications. Examples of specific applications of alumina include exhaust gas treatment from internal combustion engines of automobiles and motorcycles, and exhaust gas treatment at a high temperature from gas turbines and boilers; and alumina is widely used as a catalyst support or a support material for a noble metal. Alumina supporting a noble metal on the surface has a high catalytic activity.

When used in such applications, alumina is exposed to a high temperature of 900 to 1000° C., or more than 1200° C., leading to possible decrease in specific surface area due to sintering. In that case, the noble metal supported on alumina surface may aggregate or may be involved in sintering and taken into the inner part of the alumina, so that the catalytic activity may be reduced. It is, therefore, required for alumina to have high heat resistance with a small reduction in the specific surface area for use under high temperature conditions.

In investigation for imparting heat resistance to an alumina, for example, in Patent Literature 1, a method including the steps of preparing a mixture of an aqueous solution in which alumina or alumina hydrate powder having a particle size of 500 μm or less is dispersed and a solution containing rare earth material, and depositing the rare earth material on the alumina or the alumina hydrate in the mixture, is described.

In Patent Literature 2, a method including the steps of preparing a sol by hydrolysis of a mixture solution of aluminum alkoxide and lanthanum alkoxide, gelling the sol, and firing the gel, is described.

Patent Literature 3 describes that, by impregnating a transition alumina having a purity of 99.95% or more with an aqueous solution of lanthanum nitrate, a transition alumina having a BET specific surface area of 60 m$^2$/g or more can be obtained even after 5 hours of heat treatment at a temperature of 1200° C.

In Patent Literature 4 to 6, a method of adding a rare earth element such as lanthanum or an element such as barium to a transition alumina for improvement in thermal stability through prevention of reduction in the specific surface area of the alumina at high temperature, is described.

CITATION LIST

Patent Literature

Patent Literature 1: Japanese Unexamined Patent Publication No. S62-176542
Patent Literature 2: Japanese Unexamined Patent Publication No. S63-242917
Patent Literature 3: Japanese Unexamined Patent Publication No. S62-180751
Patent Literature 4: Japanese Unexamined Patent Publication No. S54-117387
Patent Literature 5: Japanese Unexamined Patent Publication No. S48-14600
Patent Literature 6: U.S. Pat. No. 4,021,185
Patent Literature 7: Japanese Unexamined Patent Publication No. H2-83033

SUMMARY OF INVENTION

Technical Problem

As described above, since alumina is exposed to severe thermal conditions, an alumina excellent in heat resistance, with a small reduction in the BET specific surface area by a heat treatment is required. It is, however, said that the transition alumina obtained by the method described in Patent Literature 1 or 2 has difficulty in maintaining a BET specific surface area of 50 m$^2$/g or more when subjected to a heat treatment at high temperature, for example, a heat treatment at 1200° C. for 5 hours, resulting in a problem of reduction in the catalytic activity.

The high-purity alumina used in Patent Literature 3 is expensive, requiring uneconomical processes including thermally decomposing a raw material alumina salt into a transition alumina, then impregnating the transition alumina with a lanthanum compound, and then firing the transition alumina again. In the case of using the transition alumina as catalyst support for coating, a pulverizing step is required to make a slurry for coating, and it is known that the heat resistance of alumina decreases in a step of ball mill pulverizing after impregnation as shown in the comparative example 3 of Japanese Unexamined Patent Publication No. H2-83033 (Patent Literature 7).

In the case of using alumina as support material, it is a common practice to pulverize the alumina particles into a size of several μm by media milling such as ball milling for controlling the alumina particles to have a predetermined particle size. On this occasion, with a prolonged time required to control the alumina particle size to a predetermined particle size, the crystallinity of alumina is degraded to cause a problem that the specific surface area tends to decrease when the alumina is exposed to high temperature.

As described above, the heat resistance of alumina tends to decrease through particle size control by pulverizing or the like, so that it is difficult to obtain alumina excellent in heat resistance by only addition of lanthanum or barium or the like to alumina as described in Patent Literature 4 to 6.

Embodiments of the present invention have been made in view of the circumstances as described above, and a primary object of the invention is to provide an alumina excellent in heat resistance, with a small reduction in the BET specific surface area by a heat treatment.

Solution to Problem

An alumina in an embodiment of the present invention has a multimodal particle size distribution wherein at least one of the particle sizes giving local maximum values in the particle size distribution is less than 10 μm, and comprises 1 to 5 wt % of at least one of La and Ba.

An alumina in an embodiment of the present invention may have a BET specific surface area of 90 to 500 m$^2$/g.

An alumina in an embodiment of the present invention may have a pore volume of 0.4 to 1.8 ml/g by $N_2$ adsorption measurement.

An alumina in an embodiment of the present invention may have an untamped bulk density of 0.1 to 1.1 g/ml.

An alumina in an embodiment of the present invention may have a content of Fe, Si and Na of 10 ppm or less.

An alumina in an embodiment of the present invention may comprise La and Ba, and satisfy the following expression (1):

$$0.0001 \leq [La]/[Ba] \leq 10000 \quad (1)$$

wherein [La] represents a content of La (wt %), and [Ba] represents a content of Ba (wt %).

A method for producing an automotive catalyst in an embodiment of the present invention comprises a step of producing a slurry containing at least the alumina in an embodiment of the present invention, a binder, a dispersion medium, and a noble metal, a step of coating a substrate with the slurry, and a step of heat-treating the substrate coated with the slurry to sinter the alumina.

Advantageous Effects of Invention

According to an embodiment of the present invention, an alumina excellent in heat resistance, with a small reduction in the BET specific surface area by a heat treatment is provided.

DESCRIPTION OF EMBODIMENTS

Figure 1:
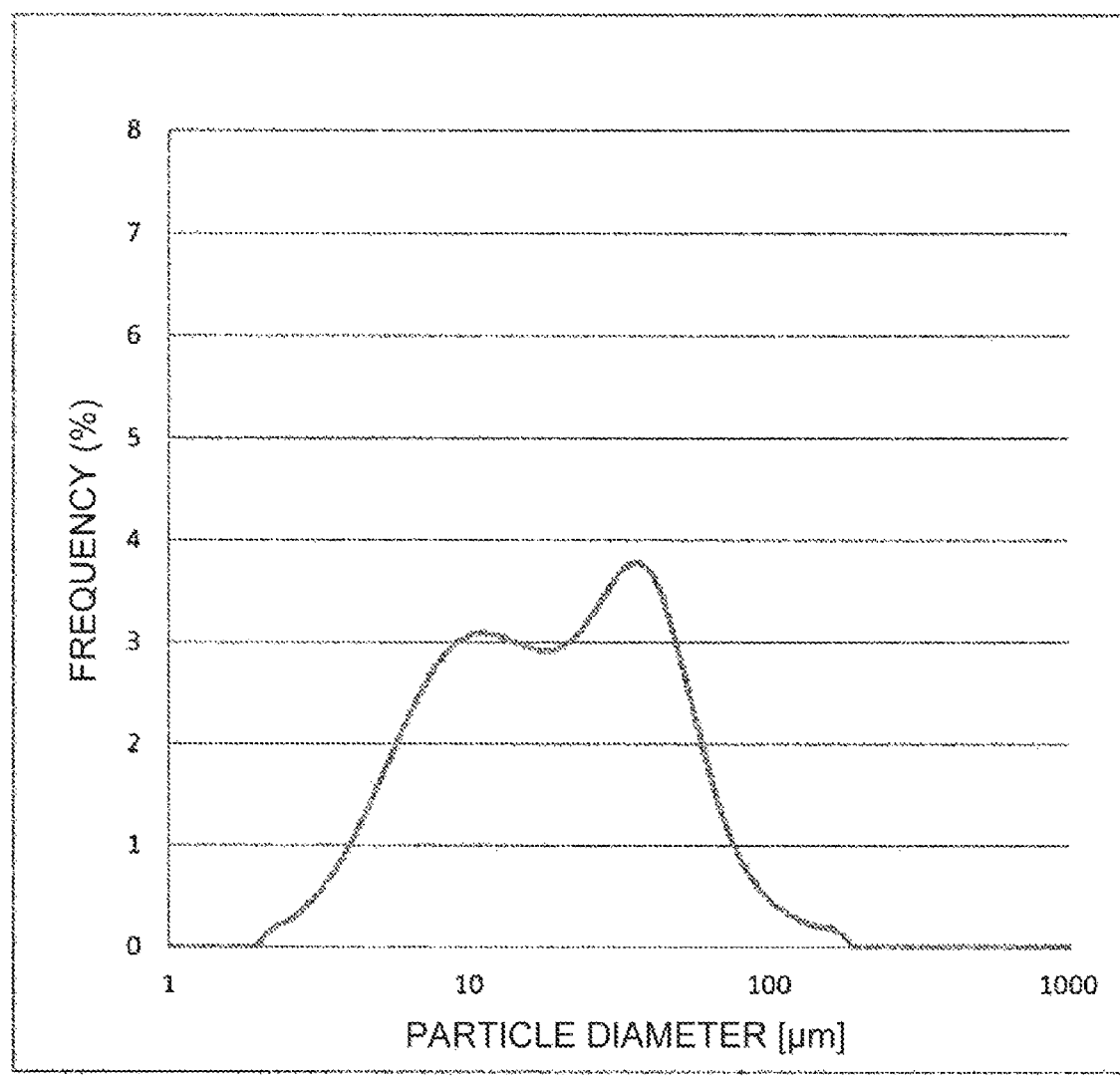
FIG. 1 is a graph showing a particle size distribution of aluminum hydroxide before firing of an alumina in an embodiment of the present invention.

An alumina in an embodiment of the present invention and a method for producing the same are described in detail as follows.

<1. Alumina>

An alumina in an embodiment of the present invention has a multimodal particle size distribution wherein at least one of the particle sizes giving local maximum values in the particle size distribution is less than 10 μm, and comprises 1 to 5 wt % of at least one of La and Ba.

Each of the constituents will be described in detail below.

[1-1. Alumina]

In the present specification, an alumina refers to α-alumina, γ-alumina, η-alumina, θ-alumina, δ-alumina, boehmite and pseudo-boehmite, which may be alone or a mixture of two or more. From the perspective of obtaining better heat resistance, the alumina preferably comprises γ-alumina, and a proportion of γ-alumina in the alumina is preferably 80 wt % or more, more preferably 90 wt % or more, and most preferably 95 wt % or more.

The alumina in an embodiment of the present invention substantially consists of alumina only, but in some cases contains inevitable impurities, such as Fe, Si and Na, brought in from raw feedstock, material, or production facilities in some circumstances. Being known to reduce catalytic performance, Fe, Si and Na are preferably not contained in alumina at all, but it is generally difficult to achieve a content of zero.

The unavoidable impurities may be contained to an extent, so long as the heat resistance of alumina is not degraded, typically at a level of 100 ppm or less. From the perspective of improving the catalyst performance, the content of Fe, Si and/or Na in total is preferably 10 ppm or less.

The content of Fe, Si, Na, etc., can be measured by emission spectroscopy.

[1-2. Particle Size Distribution]

An alumina in an embodiment of the present invention has a multimodal particle size distribution wherein at least one of the particle sizes giving local maximum values in the particle size distribution is less than 10 μm.

In the present specification, the multimodal particle size distribution refers to a particle size distribution having a plurality of local maximum values. When the ordinate represents F(x) (frequency [%]) and the abscissa represents x (particle diameter [μm]) in a particle size distribution, the particle size distribution has a particle diameter giving a local maximum value in the following ranges as described below: (1) $0 < x < 10$ and (2) $10 \leq x < 1000$.

(1) Range of $0 < x < 10$

For any x in the range of $0 < x < 10$, F(a) satisfying $F(a) > F(x)$ in the range of $x < a$ and satisfying $F(a) \geq F(x)$ in the range of $x \geq a$ is defined as the local maximum value in the range of $0 < x < 10$. A plurality of a's may be present, and the local maximum values at the a's may be different from each other.

(2) Range of $10 \leq x < 1000$

For any x in the range of $10 \leq x < 1000$, F(b) satisfying $F(b) > F(x)$ in the range of $x < b$ and satisfying $F(b) \geq F(x)$ in the range of $x \geq b$ is defined as the local maximum value in the range of $10 \leq x < 1000$. A plurality of b's may be present, and the local maximum values at the b's may be different from each other.

$F_{min}(b)/F_{min}(a)$, i.e., the ratio of the smallest local maximum value $F_{min}(b)$ in the range of $10 \leq x < 1000$ (When only one local maximum value is present in the range of $10 \leq x < 1000$, the maximum value corresponds thereto) to the smallest local maximum value $F_{min}(a)$ in the range of $0 < x < 10$ (When only one local maximum value is present in the range of $0 < x < 10$, the local maximum value corresponds thereto), is preferably 3 or less, more preferably 2.5 or less, and preferably 1 or more.

The particle size distribution can be measured by laser diffraction.

[1-3. La and Ba]

La and Ba have a function to improve the heat resistance of an alumina. The alumina in an embodiment of the present invention, therefore, comprises 1 to 5 wt % of at least one of La and Ba to improve the heat resistance. With an insufficient content of La and Ba, sufficient heat resistance cannot be achieved, while with an excessive content, the effect of improving the heat resistance does not increase effectively.

From the perspective of effectively obtaining more excellent heat resistance, the content of at least one of La and Ba is preferably 1 wt % or more, more preferably 2 wt % or more, and preferably 5 wt % or less, more preferably 4 wt % or less.

Further, from the perspective of improving the heat resistance, the both of La and Ba is preferably contained. When both of La and Ba are contained, the content of La and Ba in total is preferably 2 wt % or more, more preferably 3 wt % or more, and preferably 5 wt % or less, more preferably 4 wt % or less.

Further, from the perspective of improving the heat resistance and the catalytic performance, the alumina in an embodiment of the present invention preferably contains La and Ba, and the La content [La] (wt %) and the Ba content [Ba] (wt %) satisfy the following expression (1):

$$0.0001 \leq [La]/[Ba] \leq 10000 \quad (1)$$

For the alumina in an embodiment of the present invention a BET specific surface area is preferably 90 to 500 m²/g. Through control of the BET specific surface area in the range, the catalytic performance can be well imparted. From the viewpoint of well imparting the catalytic performance, it is more preferable that the BET specific surface area be 95 m²/g or more and 300 m²/g or less.

The BET specific surface area can be obtained by $N_2$ adsorption measurement in accordance with the method specified in JIS-Z-8830.

For the alumina in an embodiment of the present invention a pore volume is preferably 0.4 to 1.8 ml/g in $N_2$ adsorption measurement. Through control of the pore volume in the range, the phase transition of the alumina at high temperature can be suppressed. From the perspective of suppressing the phase transition of the alumina at high temperature, it is more preferable the pore volume be 0.5 ml/g or more and 1.2 ml/g or less.

The pore volume in $N_2$ adsorption measurement can be obtained by the following method.

First, the alumina is subjected to vacuum degassing. Subsequently, $N_2$ adsorption and desorption isotherms are measured by a constant volume method. From the resulting adsorption and desorption isotherms, the pore volume is calculated by BJH method.

For the alumina in an embodiment of the present invention an untamped bulk density is preferably 0.1 to 1.1 g/ml. Through control of the untamped bulk density in the range, the handling properties in a slurry preparation step can be improved. From the perspective of improving the handling properties in a slurry preparation step, it is more preferable that the untamped bulk density be 0.3 g/ml or more and 0.8 g/ml or less.

The untamped bulk density is obtained by a method described in JIS R 9301-2-3. In other words, a sample (alumina powder) freely dropped into a vibration-proof, still-standing container (cylinder) with a known volume, is collected to obtain the mass, and the mass is divided by the volume of the sample to calculate the density.

Having a multimodal particle size distribution, the alumina in an embodiment of the present invention having such a constitution has excellent dispersibility and heat resistance with a small reduction in the specific surface area even when exposed to high temperature for long time.

It is known that a conventional alumina generally causes reduction in heat resistance resulting, for example, from the particle diameter control in making a slurry, which is disadvantageous for use in various applications in some cases. In contrast, the alumina in an embodiment of the present invention causes only a small reduction in the heat resistance resulting from the particle diameter control in making a slurry, being capable of maintaining the excellent heat resistance.

The alumina having such properties in an embodiment of the present invention may be suitably used as an automotive catalyst, so that an automotive catalyst comprising an alumina excellent in heat resistance can be provided.

<2. Method for Producing Alumina>

The method for producing an alumina in an embodiment of the present invention comprises: (1) a step S1 of obtaining an aluminum alkoxide; (2) a step S2 of hydrolyzing the aluminum alkoxide in two stages to obtain aluminum hydroxide; (3) a step S3 of drying the aluminum hydroxide to obtain an aluminum hydroxide powder; (4) a step S4 of firing the aluminum hydroxide powder to obtain an alumina; and (5) a step S5 of adding at least one of La and Ba to [i] the aluminum hydroxide when the aluminum alkoxide is hydrolyzed in the step S2, or [ii] the aluminum hydroxide powder between the step S3 and the step S4.

By such a method for producing an alumina, an alumina having a multimodal particle size distribution wherein at least one of the particle sizes giving local maximum values in the particle size distribution is less than 10 μm, and wherein the alumina comprises 1 to 5 wt % of at least one of La and Ba, can be obtained.

Further, according to the production method, an alumina containing only a small amount of aggregated particles and less contamination of foreign matter, can be produced. Here, a high-purity alumina refers not only to an alumina having high purity with a small content of impurities, but also to an alumina containing less contamination of foreign matters which are not alumina components.

[2-1. Step S1 of Obtaining Aluminum Alkoxide]

In the step S1 of obtaining an aluminum alkoxide, the aluminum alkoxide (Al(OR)$_3$) is formed by a solid-liquid reaction between metal aluminum (Al) and an alcohol (ROH) as shown in the following formula (1):

Here, R is at least one each independently selected from methyl, ethyl, n-propyl, isopropyl, n-butyl, isobutyl, neobutyl, n-pentyl, isopentyl, neopentyl, n-hexyl, isohexyl, neohexyl, n-heptyl, isoheptyl, neoheptyl, n-octyl, isooctyl and neooctyl. In particular, R is preferably at least one selected from methyl, ethyl, n-propyl and isopropyl.

Although the metal aluminum as raw material is not particularly limited, it is preferable that a high-purity aluminum having a purity of 99.99% or more, with a content of impurities such as iron, silicon, copper and magnesium in the metal of 100 ppm or less, be used. By using such a high-purity metal aluminum, a high-purity alumina with a small content of impurities can be more effectively produced. Further, since the refinement of the aluminum alkoxide obtained from the metal aluminum is not required, a high efficiency can be achieved. A commercial product can be used as the high-purity aluminum.

The shape of the metal aluminum is not particularly limited, and may be in any form such as an ingot, a pellet, a foil, a wire and a powder.

As the raw material alcohol to form a liquid phase, a monovalent alcohol having 1 to 8 carbon atoms, preferably 1 to 4 carbon atoms, is used. In general, the reactivity of the raw material alcohol with metal aluminum decreases, as the length of carbon chain increases. More specifically, examples of the raw material alcohol include methyl alcohol, ethyl alcohol, n-propyl alcohol, isopropyl alcohol, n-butyl alcohol, sec-butyl alcohol and tert-butyl alcohol.

Although the reaction temperature of the metal aluminum and an alcohol is not particularly limited so long as the reaction proceeds, the reaction is preferably performed at a boiling point of the solvent system for use under reflux conditions from the perspective of accelerating the reaction between the metal aluminum and the alcohol.

By the step S1, an aluminum alkoxide having an alkoxy group corresponding to the alcohol for use is formed as described above. More specifically, examples of the aluminum alkoxide to be formed include aluminum ethoxide, aluminum n-propoxide, aluminum isopropoxide, aluminum n-butoxide, aluminum sec-butoxide, and aluminum t-butoxide.

Incidentally, the aluminum alkoxide formed in the step S1 is hydrolyzed in the hydrolysis step S2 to be described below, and the aluminum alkoxide used in that occasion may be a derivative obtained by chemical modification in the range where the physical properties of the resulting aluminum hydroxide are not impaired, or may be a mixture of the derivative and aluminum alkoxide.

[2-2. Step S2 of Hydrolyzing Aluminum Alkoxide in Two Stages to Obtain Aluminum Hydroxide]

In the step S2, the aluminum alkoxide formed in the step S1 is hydrolyzed in two stages to obtain aluminum hydroxide. Thereby, an aluminum hydroxide having a multimodal particle size distribution can be obtained. In contrast, a multimodal particle size distribution cannot be obtained by a typical method such as an alkoxide method, neutralization or thermal decomposition of aluminum salt.

Further, although a multimodal particle size distribution can be theoretically obtained by mixing two types of alumina having a different particle size distribution, the method is unsuitable for industrial application. According to the two-stage hydrolysis described in the present specification, a multimodal particle size distribution can be obtained through only one step of obtaining aluminum hydroxide, so that high production efficiency can be achieved.

The aluminum hydroxide formed by hydrolysis typically includes an ultra-fine particles having a particle diameter of several tens of nm, depending on the conditions of the hydrolysis.

The hydrolysis rate of aluminum alkoxide is very fast, and fine aluminum hydroxide particles tend to be formed resulting from a localized hydrolysis reaction. Such fine aluminum hydroxide particles tend to strongly aggregate each other, so that an agglomerate is easily formed. The conditions of hydrolysis are appropriately controlled, so that aggregation of the particles can be suppressed.

The two-stage hydrolysis is described in detail as follows.

First, as a first hydrolysis, using an alcohol solution containing water with a predetermined content, the hydrolysis of a part of aluminum alkoxide is allowed to proceed, so that a moderate hydrolysis reaction is caused without occurrence of a local reaction due to rapid heat generation (a first hydrolysis step S21). Subsequently, as a second hydrolysis, water is further added, so that the hydrolysis of the whole amount of aluminum alkoxide is allowed to proceed (a second hydrolysis step S22).

As described above, a part of aluminum alkoxide is hydrolyzed with use of an alcohol solution containing water, and then the whole amount of aluminum alkoxide is further hydrolyzed with use of water, so that the conditions of hydrolysis can be appropriately controlled, resulting in the production of aluminum hydroxide with only a small amount of aggregation, through suppression of formation of strongly aggregated particles.

Further, through hydrolysis of aluminum alkoxide with use of an alcohol solution containing water, the alcohol used in the step S1 to obtain aluminum alkoxide can be efficiently collected in alcohol collection to be described below in detail.

As described below, when aluminum alkoxide is hydrolyzed in the step S2, a step S5 of adding at least one of La and Ba to aluminum hydroxide may be performed; and by using a solution in which at least one of an La compound and a Ba compound is dissolved or a dispersion in which the same is dispersed in the hydrolysis in the step S2, an aluminum hydroxide containing at least one of La and Ba can be obtained.

Although the first hydrolysis step S21 and the second hydrolysis step S22 are described in detail as follows, the steps are not particularly limited thereto, so long as at least one of the particle diameters giving local maximum values in the particle size distribution of alumina finally obtained is less than 10 μm.

(1) First Hydrolysis Step S21

More specifically, first, in the first hydrolysis step S21, aluminum alkoxide is hydrolyzed with use of an alcohol solution containing water with a predetermined content.

In the first hydrolysis step S21, not water alone, but an alcohol solution containing water with a predetermined content, is added to the solution containing aluminum alkoxide. The water content of the alcohol solution to be added is preferably 5 to 30 wt %, more preferably 5 to 20 wt %, still more preferably 5 to 10 wt %. With a water content of 5 wt % or more in the alcohol solution, the hydrolysis sufficiently proceeds, while with a water content of 30 wt % or less, a localized hydrolysis reaction is suppressed, so that the aggregation of aluminum hydroxide can be prevented.

Further, in the first hydrolysis step S21, for example, the alcohol solution containing water with a content described above may be added to have a molar ratio of water to aluminum alkoxide of, for example, 1.5 to 2.0, for the hydrolysis. With a molar ratio of water in the alcohol solution to aluminum alkoxide of 1.5 or more, the hydrolysis of aluminum alkoxide can be prevented from being suppressed. On the other hand, with a molar ratio of 2.0 or less, the hydrolysis of aluminum alkoxide can be prevented from being accelerated to cause a local hydrolysis reaction with aggregation of aluminum hydroxide. Further, since redundant water not to be used for hydrolysis is contained, the alcohol collected in an alcohol collection step to be described below contains water, so that when the collected alcohol is recycled in the aluminum alkoxide formation step S1, the formation rate of aluminum alkoxide decreases, resulting in worsened productivity.

Although the alcohol solution containing water is not particularly limited, the alcohol used in the aluminum alkoxide formation step S1 mixed with water may be used. As described above, the alcohol solution used in hydrolysis is collected, so that the collected alcohol can be recycled in the aluminum alkoxide formation step.

The reaction temperature in hydrolysis of aluminum alkoxide with use of the alcohol solution containing water is not particularly limited, and may be, for example, in the range of room temperature or more and the boiling temperature of the solvent or less.

After completion of hydrolysis in the first hydrolysis step S21, alcohol only is separated and collected from a mixture of the alcohol solution containing water, aluminum alkoxide and aluminum hydroxide. By the collection of alcohol between the first hydrolysis step S21 and the second hydrolysis step S22, pure alcohol containing no water can be collected. The separated and collected alcohol can be recycled in the aluminum alkoxide formation step S1 described above. Although the method for collecting alcohol from the mixture is not particularly limited, examples of the method include a method for passing the mixture after hydrolysis in the first hydrolysis step S21 through a column packed with an ion exchange resin for the separation and collection.

(2) Second Hydrolysis Step S22

Subsequently, in the second hydrolysis step S22, water is further added to a mixture obtained by separating alcohol from the mixture after the first hydrolysis, so that the whole amount of aluminum alkoxide is hydrolyzed.

In the second hydrolysis step S22, water may be added such that the molar ratio of aluminum alkoxide to water is preferably 1.0 to 7.0, more preferably 1.5 to 3.0, for the hydrolysis. With a molar ratio of aluminum alkoxide to water of 1.0 or more, the hydrolysis of the whole amount of aluminum alkoxide can be sufficiently performed. On the other hand, with a molar ratio of 7.0 or less, the water content in aluminum hydroxide to be formed can be prevented from increasing too much. Thereby, in drying of aluminum hydroxide, reduction in productivity due to prolonged drying time can be prevented.

The reaction temperature in the hydrolysis in the second hydrolysis step S22 also is not particularly limited, and may be, for example, in the range of room temperature or more and the boiling temperature of the solvent or less.

[2-3. Step S3 of Drying Aluminum Hydroxide to Obtain Aluminum Hydroxide Powder]

In the step S3, the aluminum hydroxide obtained in the step S2 is dried to obtain an aluminum hydroxide powder. Through the process to dry the aluminum hydroxide, an aluminum hydroxide in a dried powder form can be obtained. Further, in the drying process, the alcohol solution can be collected.

The aluminum hydroxide powder is not required to be completely dried, and may be appropriately dried such that too much time is not required in drying and firing the aluminum hydroxide powder to obtain an alumina.

The drying conditions are not particularly limited, so long as at least one of the particle sizes giving local maximum values in the particle size distribution of the alumina finally obtained of less than 10 μm. As the drying method, for example, a method for evaporating moisture by heating aluminum hydroxide is preferred. The drying temperature is preferably at the boiling point of the solvent or more. In the drying method, for example, a dryer for materials standing still, a dryer for materials being transported, a dryer for materials being agitated, a hot air dryer for materials being transported, a cylindrical dryer, an IR dryer, a freeze drying machine, and a high-frequency dryer may be used.

The aluminum hydroxide powder obtained in the step S3 has a multimodal particle size distribution, so that by firing the aluminum hydroxide powder in the subsequent step S4, an alumina having a multimodal particle size distribution can be obtained.

So long as at least one of the particle sizes giving local maximum values in the particle size distribution of the alumina finally obtained is less than 10 μm, the local maximum values and the particle diameters giving the local maximum values in the particle size distribution of the aluminum hydroxide may be different from those of the alumina finally obtained.

The particle size distribution can be measured by laser diffraction.

[2-4. Step S5 of Adding at Least One of La and Ba]

In the step S5, at least one of La and Ba is added to [i] aluminum hydroxide when aluminum alkoxide is hydrolyzed in the step S2 as described above, or [ii] aluminum hydroxide powder between the step S3 and the step S4. The addition amount is not particularly limited, so long as the alumina finally obtained comprises 1 to 5 wt % of at least one of La and Ba.

For the addition of La and/or Ba to aluminum hydroxide, an La compound and/or a Ba compound such as an oxide, a hydroxide, a chloride, a carbonate, a nitrate, an acetate, an oxalate, an alkoxide and an acetylacetonate can be used.

The La compound and/or the Ba compound may be dissolved in a solvent to make a solution to be added. When the La compound and/or the Ba compound are difficult to dissolve in a solvent, microparticles of the La compound and/or the Ba compound may be dispersed in a solvent to make a dispersion to be added. In the solvent of the dispersion, a part of the La compound and/or the Ba compound may be dissolved.

The La compound and/or the Ba compound and the solvent may be used alone or in combination of two or more mixed for use, and may be appropriately selected in consideration of the solubility or dispersibility of the La compound and/or the Ba compound in the solvent, the concentration of the solution, and other production conditions.

From the perspective of more uniformly adding La and/or Ba to aluminum hydroxide, it is preferable that a solution of the La compound and/or the Ba compound dissolved in a solvent such as water, alcohol and another organic solvent be used. By more uniformly adding the La and/or Ba having a function to improve the heat resistance of alumina to aluminum hydroxide, an alumina uniformly containing the elements can be produced. Such alumina can suppress the reduction in the BET specific surface area after a heat treatment at high temperature, achieving more excellent heat resistance.

In performing the step S5 in the step S2, as described above, a solution in which at least one of the La compound and the Ba compound is dissolved, or a dispersion in which the same is dispersed, is used in the hydrolysis in the step S2, so that at least one of La and Ba is added to aluminum hydroxide and an aluminum hydroxide containing at least one of La and Ba can be obtained.

The step S5 is performed between the step S3 and the step S4 by bringing a solution in which at least one of the La compound and the Ba compound is dissolved, or a dispersion in which the same is dispersed, into contact with aluminum hydroxide. The contact method is not particularly limited, and may be performed, for example, by impregnating aluminum hydroxide powder with the solution, or by spraying the solution onto aluminum hydroxide powder. As an example of the addition method by spraying, the solution is sprayed onto aluminum hydroxide, while the aluminum hydroxide powder is being mixed in a container equipped with a mixing mechanism.

[2-5. Step S4 of Firing Aluminum Hydroxide Powder to Obtain Alumina]

In the step S4, an aluminum hydroxide powder including at least one of La and Ba added thereto is fired to obtain an alumina comprising 1 to 5 wt % of at least one of La and Ba.

Although the firing conditions in the firing step S4 is not particularly limited, thermal energy required for the phase transition of aluminum hydroxide powder to alumina is added.

For example, aluminum hydroxide powder is fired under the following firing conditions to obtain alumina.

Aluminum hydroxide is fired at a firing temperature of 800° C. or more for a predetermined retention time, more specifically, for example, at a firing temperature of 900 to 1100° C. for a retention time of 0.5 to 20 hours, to obtain alumina.

Although the temperature rising rate when the temperature is raised to a predetermined firing temperature is not particularly limited, for example, it is set at 30 to 500° C./hour.

Firing may be performed by, for example, using a firing furnace. Examples of the firing furnace for use include a firing furnace for materials standing still such as a tunnel kiln; a batch ventilation box-type firing furnace; and a batch parallel flow box-type firing furnace.

The firing atmosphere is not particularly limited, and firing may be performed under any one of an air atmosphere, an inert gas atmosphere such as nitrogen gas and argon gas, and a reducing atmosphere.

Alternatively, the alumina may be obtained through the successive steps of granulating the aluminum hydroxide powder prior to firing, predrying the granulated product, and firing predried granulated product packed in a container made of high-purity alumina.

The granulated product of aluminum hydroxide powder is predried and then packed in a firing container to be fired, so that the scattering loss in firing can be reduced. Further, predrying of the granulated product of aluminum hydroxide powder allows a firing container to be easily filled.

The firing container for use is not particularly limited, and may be, for example, a sheath in a box shape, a bottomed circular shape, and a polygonal columnar shape. The firing container is preferably made of alumina ceramics. With use of a firing container made of alumina ceramics, the alumina is prevented from contamination in firing, so that a high-purity alumina can be obtained.

The alumina obtained in the step S4 has a multimodal particle size distribution wherein at least one of the particle sizes giving local maximum values in the particle size distribution is less than 10 µm, and comprises 1 to 5 wt % of at least one of La and Ba.

Although the method for producing an alumina in an embodiment of the present invention has been described above, persons skilled in the art who understand the desired properties of the alumina in an embodiment of the present invention may find a method for producing an alumina having desired properties in an embodiment of the present invention other than the method described above through trials and errors.

When the alumina in an embodiment of the present invention is used in various applications, the alumina may be pulverized for control of the particle diameter. As described above, the alumina in an embodiment of the present invention causes only a small reduction in heat resistance even when subjected to particle dimeter control in making a slurry, so that the excellent heat resistance can be maintained.

The pulverizing method is not particularly limited so long as a wet method is employed, and examples thereof include a pulverizing method using a ball mill.

<3. Method for Producing Automotive Catalyst>

A method for producing an automotive catalyst in an embodiment of the present invention comprises (1) a step of producing a slurry containing at least the alumina in an embodiment of the present invention, a binder, a dispersion medium, and a noble metal, (2) a step of coating a substrate with the slurry, and (3) a step of heat-treating the substrate coated with the slurry to sinter the alumina in the slurry.

Examples of the binder include PVA and a boehmite gel (gelatinous alumina hydrate). Examples of the dispersion medium include water and an alcohol, and use of water is preferred. Examples of the noble metal include Pt, Pd and Rh.

The slurry may contain an additional component in addition to the alumina in an embodiment of the present invention, a binder, a dispersion medium, and a noble metal.

As the substrate, a generally used honeycomb support may be used. Examples of the method for coating a support with a slurry include a wash-coating method.

The step of sintering alumina may be performed, for example, at 800 to 1100° C. for a retention time of 0.5 to 10 hours.

Since the alumina in an embodiment of the present invention has excellent heat resistance, an automotive catalyst equipped with an alumina excellent in heat resistance can be provided by the method for producing an automotive catalyst in an embodiment of the present invention.

EXAMPLES

Although the embodiments of the present invention are more specifically described with reference to Examples as follows, the present invention is not limited by the following Examples, and may be appropriately modified in the range conforming to the gist described above or below for the practice without departing from the technical scope of the present invention.

[1-1. Production of Alumina in Example 1]

A mixture of isopropyl alcohol and water (weight ratio of isopropyl alcohol to water: 9:1) was added to heated molten aluminum isoproxide such that the molar ratio of water to aluminum alkoxide was 1.7, so that the first hydrolysis step S21 was performed.

Subsequently, 60 wt % of isopropyl alcohol was collected relative to the isopropyl alcohol added in the first hydrolysis step S21. Water was then added such that the molar ratio of water to aluminum alkoxide was 1.7, so that the second hydrolysis step S22 was performed to obtain a suspension comprising aluminum hydroxide, water and isopropyl alcohol. The resulting suspension was agitated, heated and dried to obtain an aluminum hydroxide powder. A part of the resulting aluminum hydroxide powder was ultrasonically dispersed in an aqueous solution of 0.2 wt % of sodium hexametaphosphate, and the particle size distribution was measured by laser diffraction using a laser particle size distribution analyzer (MICROTRAC, manufactured by Nikkiso Co., Ltd.), and was found to have a multimodal particle size distribution as shown in FIG. 1.

While 64 parts by weight of an aqueous solution containing 14 wt % of lanthanum acetate and 0.03 wt % of barium acetate was being sprayed onto 100 parts by weight of an aluminum hydroxide powder, the aluminum hydroxide powder was agitated to obtain an aluminum hydroxide powder containing La and Ba. After the water content in the aluminum hydroxide powder was removed by heating and agitation, the powder was fired at 1000° C. for 4 hours in an electric furnace, so that an alumina containing La and Ba in Example 1 was obtained.

[1-2. Production of Alumina in Example 2]

An alumina containing La and Ba in Example 2 was obtained in the same manner as in Example 1 except that 64 parts by weight of an aqueous solution containing 3.0 wt % of lanthanum acetate and 2.3 wt % of barium acetate was sprayed onto 100 parts by weight of an aluminum hydroxide powder.

[1-3. Production of Alumina in Example 3]

An alumina containing La and Ba in Example 3 was obtained in the same manner as in Example 1 except that 64 parts by weight of an aqueous solution containing 0.03 wt % of lanthanum acetate and 6.52 wt % of barium acetate was sprayed onto 100 parts by weight of an aluminum hydroxide powder.

[1-4. Production of Alumina in Example 4]

An alumina containing La and Ba in Example 4 was obtained in the same manner as in Example 1 except that the firing temperature in an electric furnace was set at 900° C.

[1-5. Production of Alumina in Example 5]

An alumina containing La and Ba in Example 5 was obtained in the same manner as in Example 1 except that the firing temperature in an electric furnace was set at 800° C.

[2. Evaluation on properties of Alumina in Examples]

(1) Particle Size Distribution

Figure 2:
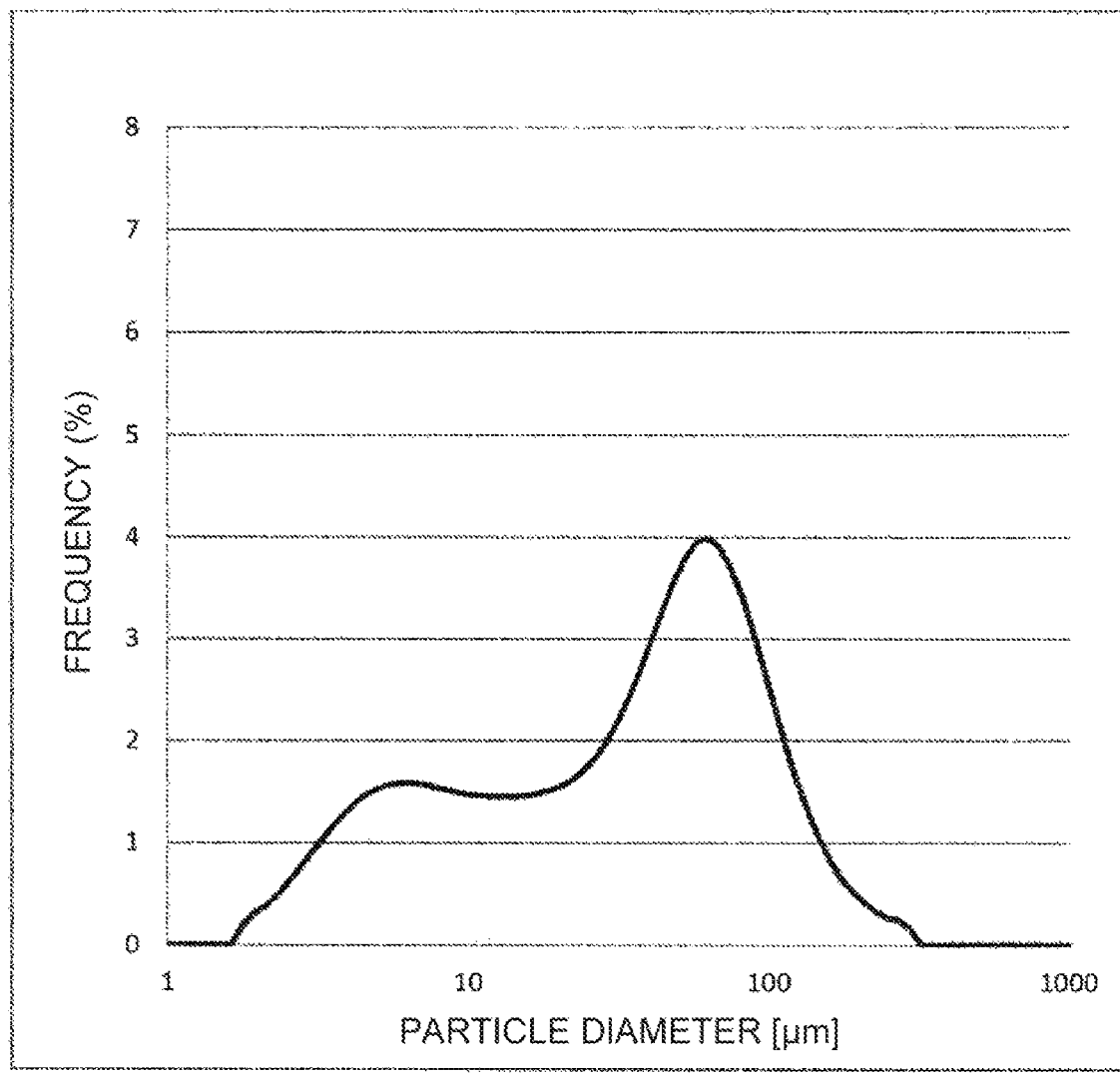
FIG. 2 is a graph showing a particle size distribution of an alumina in an embodiment of the present invention.

As with the case of the aluminum hydroxide powder, the alumina was ultrasonically dispersed in 0.2 wt % of sodium hexametaphosphate aqueous solution, and the particle size distribution was measured by laser diffraction using a laser particle size distribution analyzer (MICROTRAC, manufactured by Nikkiso Co., Ltd.). The particle size distribution of the alumina in Example 1 had a multimodal particle size distribution having a local maximum value in each of the range of less than 10 μm and the range of 10 μm or more as shown in FIG. 2.

The particle size distribution had a local maximum value in the range of less than 10 μm, and the local maximum value was 1.58 [%], at a particle diameter of 6 μm giving the local maximum value. The distribution further had a local maximum value in the range of 10 μm or more, and the maximum value was 3.99 [%], at a particle diameter of 62 μm giving the local maximum value. The ratio of the local maximum value in the range of less than 10 μm to the local maximum value in the range of 10 μm or more was 2:5.

The particle size distribution of alumina in each of Examples 2 to 5 was measured in the same manner. All of the alumina in Examples 2 to 5 had a multimodal particle distribution having a local maximum value in each of the range of less than 10 μm and the range of 10 μm or more.

The particle diameter giving the local maximum value in the range of less than 10 μm, and the particle diameter giving the local maximum value in the range of 10 μm or more are shown in Table 1.

(2) Particle Diameter D50

Alumina was ultrasonically dispersed in 0.2 wt % of sodium hexametaphosphate aqueous solution, and the particle size corresponding to a cumulative percentage of 50% on weight basis (particle diameter D50) was measured by laser diffraction using a laser particle size distribution analyzer (MICROTRAC, manufactured by Nikkiso Co., Ltd.). The results are shown in Table 1. In Table 1, the measurement results are represented by "particle diameter D50 before ball mill dispersion".

Further, 50 g of alumina, 150 g of pure water, and 1500 g of zirconia beads having a diameter of 0.65 mm fed in a pot having an internal volume of 1000 ml were subjected to dispersion treatments using a ball mill, at 60 rpm for 30 minutes, 60 minutes and 90 minutes, respectively. The measurement results of the particle diameter D50 of the slurry obtained in the dispersion treatments are shown in Table 1. In Table 1, the measurement results are represented by "particle diameter D50 after ball mill dispersion".

(3) Content of La and Ba

The content of La and Ba was obtained by IPC emission spectroscopy. The results are shown in Table 1.

(4) BET Specific Surface Area

Using a specific surface area measurement apparatus "FLOW SORB II 2300" manufactured by Shimadzu Corporation, the BET specific surface area of alumina (BET-1) was obtained by $N_2$ adsorption method specified in JIS-Z-8830. Subsequently, a heat treatment at 1200° C. for 4 hours was performed to measure the BET specific surface area (BET-2). Note that the BET specific surface area as defined in the embodiments of the present invention refers to the BET-1.

Further, the slurry subjected to the dispersion treatment for 60 minutes obtained in the item (2) described above was dried at 80° C. for 20 hours with a fan dryer to obtain powder. The resulting powder was heat-treated at 1200° C. for 4 hours, and the BET specific surface area was measured (BET-3).

The results are shown in Table 1. In the table, the BET retention rate means a value expressed by the following expression (2). As described above, although the heat resistance of alumina decreases through particle diameter control (pulverization), as the BET retention rate increases, the reduction in heat resistance through particle diameter control decreases, so that excellent heat resistance can be achieved.

BET retention rate [%]=(BET-3)/(BET-2)×100    (2)

(5) Pore Volume Based on $N_2$ Adsorption Measurement

The pore volume based on $N_2$ adsorption measurement was obtained by the following method.

First, using "BELPREP-vac II" manufactured by Microtrac Bell Co., an alumina was subjected to vacuum degassing at 120° C. for 8 hours.

Subsequently, using "BELSORP-mini" manufactured by Microtrac Bell Co., $N_2$ adsorption and desorption isotherms were measured by a constant volume method under the following conditions:

Adsorption temperature: 77 K

Adsorbate: $N_2$

Saturated vapor pressure: actual measurement

Adsorbate cross-sectional area: 0.162 $nm^2$

Equilibrium waiting time: 500 seconds

From the resulting adsorption and desorption isotherms, pore volume was calculated by BJH method. The results are shown in Table 1.

(6) Untamped Bulk Density

The untamped bulk density was obtained as follows: into a 10-mL graduated cylinder, 9 to 10 mL of a sample was fed for the measurement of the weight [g] of the sample; the graduated cylinder was capped, inverted, and returned to the original position to cause a moderate free fall of the sample; and then the volume [$cm^3$] of the sample was measured. The inversion and reversion was repeated three times to obtain an average volume [$cm^3$], and the value of sample weight divided by sample average volume was defined as the untamped bulk density [$g/cm^3$]. The results are shown in Table 1.

(7) Tamped Bulk Density

The tamped bulk density was obtained as follows: a graduated cylinder filled with the sample after measurement of the untamped bulk density was subjected to free falls from a height of 3 cm onto a hard rubber plate 100 times, and then the volume [$cm^3$] of the sample was measured; the value of sample weight divided by sample volume was defined as the tamped bulk density [$g/cm^3$]; and the results are shown as reference values in Table 1.

(8) Content of Fe, Si and Na

The content of Fe, Si and Na was measured by emission spectroscopy (THERMO Jarrell Ash CID-DCA AURORA). The results are shown in Table 1.

(9) Pore Radius

The adsorption and desorption isotherms were measured in the same manner as in the item (5) described above, and from the resulting adsorption and desorption isotherms, the pore radius was calculated by BJH method. The results are shown in Table 1.

[3. Evaluation on Properties of Alumina in Comparative Example]

As the alumina in Comparative Example, "PURALOX SCFa 140/L3" manufactured by Sasol was used.

Figure 3:
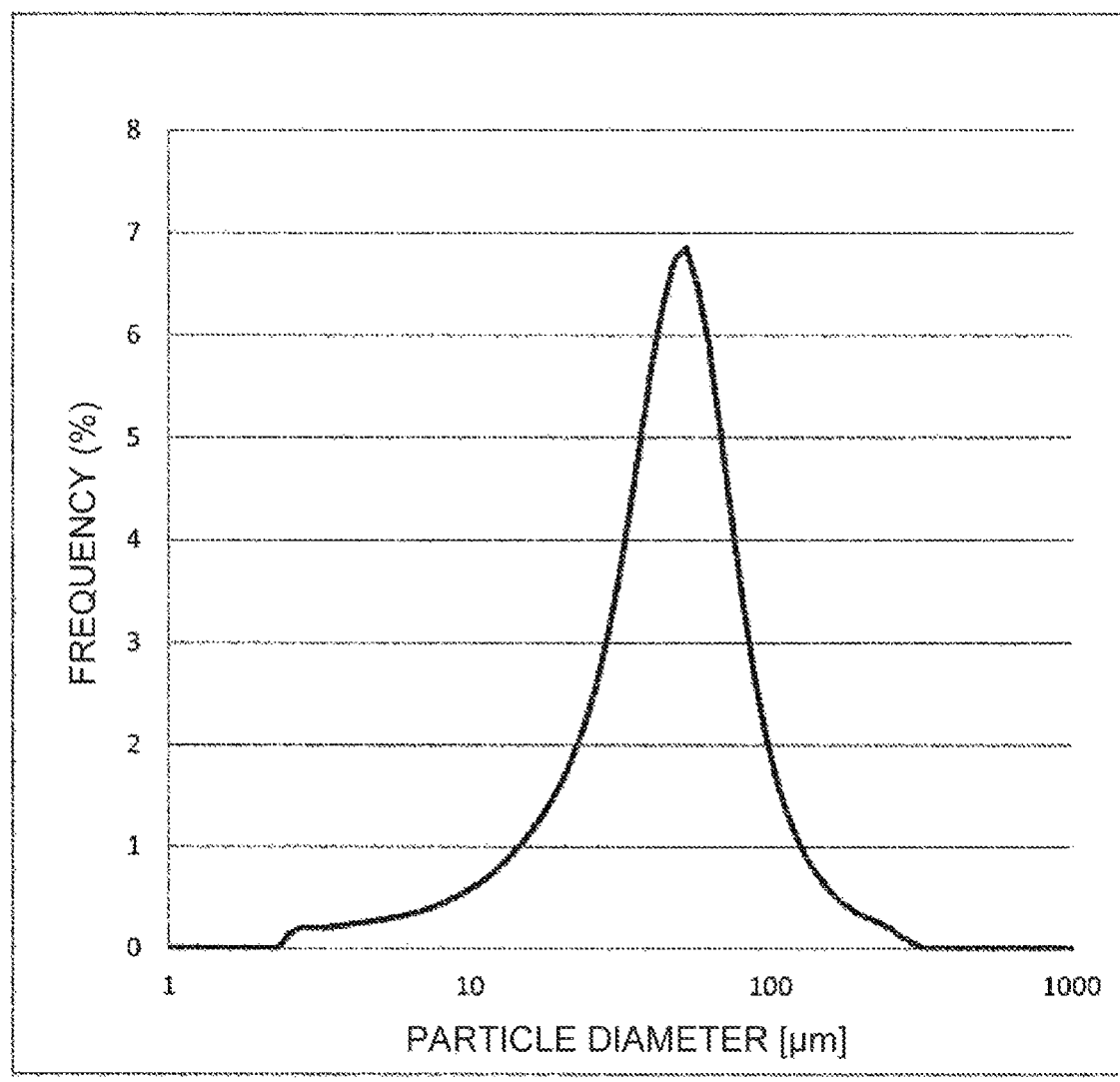
FIG. 3 is a graph showing a particle size distribution of an alumina in Comparative Example.

The results of the particle size distribution of alumina in Comparative Example measured in the same manner as in the item (1) are shown in FIG. 3. As shown in FIG. 3, the particle size distribution of the alumina in Comparative Example had a monomodal particle size distribution having only one maximum value, and the maximum value was 2.69 [%], at the particle diameter giving the maximum value of 52 μm.

The properties were evaluated in the same manner as in the items (2) to (9) described above. In the measurement of the BET specific surface area in the item (4), however, a slurry dispersed for 90 minutes was used. The particle size distribution is shown in FIG. 3, and the other results are shown in Table 1.

Further, the alumina in Examples had excellent dispersibility, allowing a slurry having a fine particle size to be obtained in a short dispersion time.

Further, the alumina in Examples had high purity, with a less content of Fe, Si and Na.

In contrast, although comprising 1 to 5 wt % of at least one of La and Ba, the alumina in Comparative Example had a monomodal particle size distribution as shown in FIG. 3, with a BET retention rate of 82.3%, which was lower than those in Example, having caused reduction in heat resistance after particle size control.

The present application claims priority from a basic application: Japanese Patent Application No. 2016-149995 with a filing date of Jul. 29, 2016. The Japanese Patent Application No. 2016-149995 is incorporated herein by reference.

The invention claimed is:

1. An alumina having a multimodal particle size distribution wherein at least one of the particle sizes giving local maximum values in the particle size distribution is less than 10 μm, and wherein the alumina comprises 1 to 5 wt % of at least one of La and Ba, and

TABLE 1

|  |  | Example 1 | Example 2 | Example 3 | Example 4 | Example 5 | Comparative Example |
|---|---|---|---|---|---|---|---|
| Particle size giving local maximum value in range of less than 10 μm [μm] | | 6 | 6 | 6 | 7 | 6 | — |
| Particle size giving local maximum value in range of 10 μm or more [μm] | | 62 | 52 | 62 | 62 | 62 | 52 |
| La content [wt %] | | 2.9 | 1.0 | 0.0010 | 2.9 | 2.9 | 2.6 |
| Ba content [wt %] | | 0.0010 | 0.90 | 2.8 | 0.010 | 0.010 | <0.00001 |
| La content/Ba content (weight ratio) | | 2890 | 1.1 | 0.00036 | 301 | 301 | >260000 |
| BET [g/m²] | BET-1 Initial stage (no treatment) | 100 | 101 | 94 | 156 | 263 | 142 |
| | BET-2 1200° C. (heat treatment) | 50.9 | 63.9 | 60.7 | 50.3 | 51.3 | 50.9 |
| | BET-3 Ball mill dispersion→1200° C. (particle diameter control→heat treatment) | 46.0 | 57.9 | 55.5 | 46.8 | 46.3 | 41.9 |
| BET retention rate [%] | | 90.4 | 90.6 | 91.4 | 93.0 | 90.3 | 82.3 |
| Particle diameter D50 before ball mill dispersion [μm] | | 37.0 | 25.8 | 24.5 | 26.0 | 31.5 | 44.8 |
| Particle diameter D50 after ball mill dispersion [μm] | Dispersion for 30 minutes | 7.2 | 7.8 | 7.6 | 7.2 | 7.5 | — |
| | Dispersion for 60 minutes | 4.9 | 6.1 | 5.8 | 5.3 | 6.0 | 6.7 |
| | Dispersion for 90 minutes | 4.0 | 5.1 | 5.3 | 4.9 | 5.0 | 5.3 |
| Pore volume based on N₂ adsorption measurement [ml/g] | | 0.67 | 0.72 | 0.78 | 0.67 | 0.99 | 0.56 |
| Pore radius [nm] | | 10.61 | 10.03 | 11.21 | 10.61 | 8.66 | 6.08 |
| Untamped bulk density [g/ml] | | 0.43 | 0.43 | 0.43 | 0.43 | 0.40 | 0.63 |
| Tamped bulk density [g/ml] | | 0.54 | 0.54 | 0.54 | 0.55 | 0.51 | 0.77 |
| Fe [ppm] | | <2 | <2 | <2 | <2 | <2 | 74 |
| Si [ppm] | | <3 | <3 | <3 | <3 | <3 | 60 |
| Na [ppm] | | <2 | <2 | <2 | <2 | <2 | 10 |

As shown in FIG. 2 and Table 1, the alumina in Examples had a multimodal particle size distribution wherein at least one of the particle sizes giving local maximum values in the particle size distribution is less than 10 μm, and comprised 1 to 5 wt % of at least one of La and Ba.

Therefore, the alumina in Examples had less reduction in the BET specific surface area after a heat treatment and excellent heat resistance in comparison with that in Comparative Example, with a BET retention rate of 90% or more in any of Examples 1 to 5, exhibiting excellent heat resistance after particle size control.

wherein the alumina comprises La and Ba, and satisfies the following expression (1):

$$0.00036 \leq [La]/[Ba] \leq 2890 \quad (1)$$

wherein [La] represents a content of La (wt %), and [Ba] represents a content of Ba (wt %), and wherein the La and Ba are uniformly contained in the alumina.

2. The alumina according to claim 1, having a BET specific surface area of 90 to 500 m²/g.

3. The alumina according to claim 1, having a pore volume of 0.4 to 1.8 ml/g by N₂ adsorption measurement.

4. The alumina according to claim 1, having an untamped bulk density of 0.1 to 1.1 g/ml.

5. The alumina according to claim 1, having a content of Fe, Si and Na in total of 10 ppm or less.

6. A method for producing an automotive catalyst comprising:
   a step of producing a slurry containing at least the alumina according to claim 1, a binder, a dispersion medium, and a noble metal;
   a step of coating a substrate with the slurry; and
   a step of heat-treating the substrate coated with the slurry to sinter the alumina.

* * * * *